United States Patent
Nakashima et al.

(10) Patent No.: US 10,112,369 B2
(45) Date of Patent: *Oct. 30, 2018

(54) TRANSPARENT MULTILAYER FILM CONTAINING POLY(METH)ACRYLIMIDE-BASED RESIN LAYER, AND METHOD FOR PRODUCING SAID TRANSPARENT MULTILAYER FILM

(71) Applicant: RIKEN TECHNOS CORPORATION, Tokyo (JP)

(72) Inventors: Kohei Nakashima, Tokyo (JP); Shintaro Negimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 3 days.

This patent is subject to a terminal disclaimer.

(21) Appl. No.: 15/022,889

(22) PCT Filed: Jul. 4, 2014

(86) PCT No.: PCT/JP2014/067904
§ 371 (c)(1),
(2) Date: Mar. 17, 2016

(87) PCT Pub. No.: WO2015/040931
PCT Pub. Date: Mar. 26, 2015

(65) Prior Publication Data
US 2016/0229159 A1   Aug. 11, 2016

(30) Foreign Application Priority Data

Sep. 20, 2013   (JP) ................................ 2013-195145

(51) Int. Cl.
*B32B 27/08* (2006.01)
*B32B 27/16* (2006.01)
(Continued)

(52) U.S. Cl.
CPC ............ *B32B 27/08* (2013.01); *B29C 47/004* (2013.01); *B29C 47/065* (2013.01); *B29C 47/14* (2013.01); *B29C 47/92* (2013.01); *B32B 27/16* (2013.01); *B32B 27/308* (2013.01); *B32B 27/365* (2013.01); *B32B 37/153* (2013.01); *B29C 2947/92704* (2013.01); *B29K 2069/00* (2013.01); *B29K 2079/085* (2013.01); *B29L 2009/00* (2013.01); *B32B 2250/03* (2013.01); *B32B 2250/05* (2013.01); *B32B 2250/24* (2013.01); *B32B 2255/10* (2013.01); *B32B 2255/26* (2013.01); *B32B 2264/0214* (2013.01); *B32B 2264/102* (2013.01);
(Continued)

(58) Field of Classification Search
CPC ..... B29C 47/004; B29C 47/065; B29C 47/14; B29C 47/92; B29C 2947/92704; B29K 2069/00; B29K 2079/085; B29L 2009/00; B32B 27/08; B32B 27/308; B32B 27/365; B32B 27/16; B32B 37/153; B32B 2250/05; B32B 2307/412; B32B 2457/20; B32B 2250/03; B32B 2250/24; B32B 2255/10; B32B 2255/26; B32B 2307/554; B32B 2307/558; B32B 2457/208; B32B 2264/0214; B32B 2264/102; B32B 2264/12; B32B 2307/536; B32B 2379/08
See application file for complete search history.

(56) References Cited

U.S. PATENT DOCUMENTS 5,006,582 A   4/1991   Mancinelli
5,225,470 A   7/1993   Mancinelli
(Continued)

FOREIGN PATENT DOCUMENTS

CN   1614447 A    5/2005
CN   101462353 A  6/2009
(Continued)

OTHER PUBLICATIONS

Machine English translation of JP 1992-019142, Jakanishi et al., Jan. 23, 1992.*

(Continued)

*Primary Examiner* — Patrick D Niland
(74) *Attorney, Agent, or Firm* — Bracewell LLP; Constance Gall Rhebergen

(57) ABSTRACT

Embodiments of the invention provide a transparent poly (meth)acrylimide-based resin multilayer film exhibiting excellent surface smoothness, transparency, outer appearance, and resistance to puchability. According to at least one embodiment, there is provided a method for producing said transparent multilayer film, in which the transparent multilayer film in which a first poly(meth)acrylimide-based resin layer (α1), an aromatic polycarbonate-based resin layer (β), and a second poly(meth)acrylimide-based resin layer (α2) are directly laminated in said order, and in that the total light transmittance exceeds 90% and the haze is 2.0% or lower. The transparent multilayer film is produced by continuously coextruding, from a T die, a molten film of the transparent multilayer film in which the aforementioned layers were directly laminated in the aforementioned order, and by supplying and then pressing the molten film between a first mirror body that has a surface temperature between 100 and 200° C. and a second mirror body that has a surface temperature between 20 and 200° C.

9 Claims, 1 Drawing Sheet

(51) Int. Cl.
  *B32B 27/30* (2006.01)
  *B32B 27/36* (2006.01)
  *B32B 37/15* (2006.01)
  *B29C 47/00* (2006.01)
  *B29C 47/06* (2006.01)
  *B29C 47/14* (2006.01)
  *B29C 47/92* (2006.01)
  *B29K 69/00* (2006.01)
  *B29K 79/00* (2006.01)
  *B29L 9/00* (2006.01)

(52) U.S. Cl.
  CPC ..... *B32B 2264/12* (2013.01); *B32B 2307/412* (2013.01); *B32B 2307/536* (2013.01); *B32B 2307/554* (2013.01); *B32B 2307/558* (2013.01); *B32B 2307/732* (2013.01); *B32B 2307/75* (2013.01); *B32B 2379/08* (2013.01); *B32B 2457/20* (2013.01); *B32B 2457/208* (2013.01)

(56) References Cited

U.S. PATENT DOCUMENTS

| | | | |
|---|---|---|---|
| 6,842,288 | B1 | 1/2005 | Liu et al. |
| 2005/0163943 | A1* | 7/2005 | Uchiyama ............... B32B 27/08 428/1.31 |
| 2006/0134362 | A1 | 6/2006 | Lu et al. |
| 2007/0076166 | A1 | 4/2007 | Kobuchi et al. |
| 2007/2254009 | | 9/2007 | Matsumoto |
| 2009/0166917 | A1 | 7/2009 | Maekawa et al. |
| 2012/0232198 | A1* | 9/2012 | Sasaki ..................... C08L 69/00 524/186 |
| 2013/0143999 | A1 | 6/2013 | Tanaka et al. |
| 2014/0370307 | A1 | 12/2014 | Hao et al. |

FOREIGN PATENT DOCUMENTS

| | | |
|---|---|---|
| CN | 101490176 A | 7/2009 |
| CN | 102019680 A | 4/2011 |
| JP | 04019142 A | 1/1992 |
| JP | H0419142 A | 1/1992 |
| JP | H06166714 A | 6/1994 |
| JP | H06256537 A | 9/1994 |
| JP | H0792306 A | 4/1995 |
| JP | H09159804 A | 6/1997 |
| JP | H09290427 A | 11/1997 |
| JP | H11225923 A | 8/1999 |
| JP | H11255923 A | 9/1999 |
| JP | 2000280268 A | 10/2000 |
| JP | 2000327836 A | 11/2000 |
| JP | 2002338702 A | 11/2002 |
| JP | 2005213410 A | 8/2005 |
| JP | 2006182879 A | 7/2006 |
| JP | 2006309033 A | 11/2006 |
| JP | 2006328331 A | 12/2006 |
| JP | 2006328334 A | 12/2006 |
| JP | 2007047605 A | 2/2007 |
| JP | 2007093927 A | 4/2007 |
| JP | 2007137022 A | 6/2007 |
| JP | 2008019403 A | 1/2008 |
| JP | 2008181091 A | 8/2008 |
| JP | 2008255175 A | 10/2008 |
| JP | 2008277022 A | 11/2008 |
| JP | 2009107180 A | 5/2009 |
| JP | 2009137206 A | 6/2009 |
| JP | 2009139660 A | 6/2009 |
| JP | 2009162848 A | 7/2009 |
| JP | 2009191167 A | 8/2009 |
| JP | 2009244757 A | 10/2009 |
| JP | 2009279806 A | 12/2009 |
| JP | 2009292871 A | 12/2009 |
| JP | 2009294261 A | 12/2009 |
| JP | 2010017874 A | 1/2010 |
| JP | 2010064332 A | 3/2010 |
| JP | 2010085978 A | 4/2010 |
| JP | 2010105188 A | 5/2010 |
| JP | 2010162899 A | 7/2010 |
| JP | 2010221565 A | 10/2010 |
| JP | 2010254742 A | 11/2010 |
| JP | 2010284840 A | 12/2010 |
| JP | 2011519999 A | 7/2011 |
| JP | 2012052010 A | 3/2012 |
| JP | 2012056252 A | 3/2012 |
| JP | 2013086273 A | 5/2013 |
| JP | 2013208896 A | 10/2013 |
| WO | 2012086656 A1 | 6/2012 |
| WO | 2013128697 A | 9/2013 |
| WO | 2015072240 A1 | 5/2015 |

OTHER PUBLICATIONS

Machine English translation of JP 2002-338702, Awaji et al., Nov. 27, 2002.*
Machine English translation of JP 2009-279806, Niwa et al., Dec. 3, 2009.*
CN201480039071.0 Office Action dated Dec. 30, 2016; 17 pgs.
PCT/JP2014/067904 International Search Report dated Nov. 11, 2014; 2pgs.
CN201480051437.6 Office Action dated Nov. 30, 2016; 16pgs.
JP2014-115362 Office Action dated Apr. 5, 2016; 10pgs.
JP2014-115361 Office Action dated Mar. 18, 2016; 8pgs.
CN201480062919.1 Office Action dated Jun. 1, 2017; 15pgs.
CN201480062919.1 Office Action dated Nov. 27, 2017; 11 pgs.
CN201480039071.0 Office Action dated Jul. 21, 2017; 39 pgs.
CN201480051437.6 Office Action dated Aug. 2, 2017; 16 pgs.
KR1020167007114 Office Action dated Aug. 25, 2017; 13 pgs.
TW103139023 Decision of Rejection dated Aug. 3, 2018; 8 pgs.
CN201480039071.0 Office Action dated Jan. 9, 2018; 42 pages.
JP2014-140158 Office Action dated Mar. 8, 2018; 12 pgs.
TW103139023 Office Action dated Mar. 28, 2018; 12 pages.
KR1020167007114 Office Action dated Feb. 21, 2018; 13 pages.

* cited by examiner

200

TRANSPARENT MULTILAYER FILM CONTAINING POLY(METH)ACRYLIMIDE-BASED RESIN LAYER, AND METHOD FOR PRODUCING SAID TRANSPARENT MULTILAYER FILM

CROSS REFERENCE TO RELATED APPLICATION

This application claims the benefit of and priority to PCT/JP2014/067904 filed on Jul. 4, 2014, entitled (translation), "TRANSPARENT MULTILAYER FILM CONTAINING POLY(METH) ACRYLIMIDE-BASED RESIN LAYER, AND METHOD FOR PRODUCING SAID TRANSPARENT MULTILAYER FILM," which claims the benefit of and priority to Japanese Patent Applications No. 2013-195145, each filed on Sep. 20, 2013, all of which are hereby incorporated by reference in their entirety into this application.

BACKGROUND

Field of the Invention

Embodiments of the invention relate to a transparent multilayer film containing a poly(meth)acrylimide resin layer, and a method for producing the same. In particular, embodiments of the invention relate to a transparent multilayer film containing a poly(meth)acrylimide resin layer, which is excellent in surface smoothness, transparency, appearance and punching processability, and a method for producing the same.

Description of the Related Art

In recent years, touch panels have come into wide use which are installed on image display apparatuses, such as liquid crystal displays, plasma displays and electroluminescence displays, and on which input can be made by touch with a finger, a pen or the like while a display is being looked at.

Members having glass as base materials have conventionally been used for touch panel display face plates and transparent conductive substrates, since they meet required properties such as heat resistance, dimensional stability, high transparency, high surface hardness and high rigidity. However, the glass has the disadvantages of being low in impact resistance to be liable to be broken, low in processability, difficult in handling, high in specific gravity and weighty, and difficult in meeting requirements of face curving and flexibilization of displays, and the like.

Then, materials as a substitute for glass are actively being studied; there are proposed many hard coat-laminated films in which a hard coat excellent in surface hardness and abrasion resistance is formed on the surface of a transparent resin film base material of triacetyl cellulose, polyethylene terephthalate, polycarbonate, polymethyl methacrylate or norbornene polymer or the like. However, their heat resistance and dimensional stability are insufficient.

Particularly with respect to substitutes of transparent conductive substrates, it is desired that when a transparent conductive layer is formed, the process temperature is kept high to increase the degree of crystallinity, thereby lowering the surface resistance. However, adoption of hard coat-laminated films formed from the transparent resin film base material has not been progressed for the following reasons: since the heat resistance of the transparent resin film base material is insufficient, the process temperature cannot be raised; since the heat resistance of the transparent resin film base material is insufficient, a thin film transistor cannot be further formed on a transparent conductive laminated film; and the like. It is the present situation that for transparent conductive substrates, glass is exclusively used.

Then, the inventors have studied using a poly(meth) acrylimide resin as a transparent resin film base material. The poly(meth)acrylimide resin is a thermoplastic resin which maintains characteristics, as they are, of acrylic resins of high transparency, high surface hardness and high rigidity, also has characteristics introduced thereto of polyimide resins of excellent heat resistance and dimensional stability, and is improved in a drawback of coloration from light yellow to reddish brown.

Such a conventional poly(meth)acrylimide resin is known. The usual T die extrusion method, however, cannot provide a poly(meth)acrylimide resin film excellent in surface smoothness, transparency and appearance.

The conventional art provides "an acrylic film thin in film thickness and good in die line, surface roughness and film wrinkle, and a method for producing the same." Since the poly(meth)acrylimide resin has also characteristics of acrylic resins, the inventors have attempted the application known in the conventional art, but there cannot be obtained after all a poly(meth)acrylimide resin film excellent in surface smoothness, transparency and appearance.

When a transparent resin film base material is processed as a touch panel display face plate or a transparent conductive substrate, it is advantageous in view of the production efficiency that a punching method can be applied. It has been found, however, that the poly(meth)acrylimide resin film has a drawback to the punching processability.

SUMMARY

Embodiments of the invention have been achieved in consideration of the situation as described above, and provide a transparent multilayer film containing a poly(meth) acrylimide resin layer, which is excellent in surface smoothness, transparency, appearance and punching processability, and a method for producing the same.

Further, another embodiment of the invention provides an image display apparatus member containing the transparent multilayer film containing a poly(meth)acrylimide resin layer. The "image display apparatus" referred to herein includes image display apparatuses having a touch panel function and image display apparatuses having no touch panel function.

According to at least one embodiment of the invention, there is provided a transparent multilayer film, including: a first poly(meth)acrylimide resin layer ($\alpha$1); an aromatic polycarbonate resin layer ($\beta$); and a second poly(meth) acrylimide resin layer ($\alpha$2), the layers being laminated directly in this order, wherein the transparent multilayer film satisfies the following requirements (i) and (ii): (i) a total light transmittance of higher than 90%; and (ii) a haze of 2.0% or lower.

According to at least one embodiment, there is provided a hard coat-laminated film, including a transparent multilayer film, including: a first poly(meth)acrylimide resin layer ($\alpha$1); an aromatic polycarbonate resin layer ($\beta$); and a second poly(meth)acrylimide resin layer ($\alpha$2), the layers being laminated directly in this order, wherein the transparent multilayer film satisfies the following requirements (i) and (ii): (i) a total light transmittance of higher than 90%; and (ii) a haze of 2.0% or lower, and a hard coat formed on at least one surface of the transparent multilayer film.

According to at least one embodiment, a surface of the hard coat has a pencil hardness of 7H or higher.

According to at least one embodiment, there is provided an image display apparatus member, including a film including: a first poly(meth)acrylimide resin layer (α1); an aromatic polycarbonate resin layer (β); and a second poly(meth)acrylimide resin layer (α2), the layers being laminated directly in this order, wherein the transparent multilayer film satisfies the following requirements (i) and (ii): (i) a total light transmittance of higher than 90%; and (ii) a haze of 2.0% or lower.

According to at least one embodiment, there is provided a method for producing a transparent multilayer film, including the steps of: (A) continuously coextruding, with a coextrusion apparatus equipped with an extruder and a T die, a molten film of a transparent multilayer film from the T die, wherein the transparent multilayer film has a first poly(meth)acrylimide resin layer (α1), an aromatic polycarbonate resin layer (β), and a second poly(meth)acrylimide resin layer (α2), the layers being laminated directly in this order; and (B) feeding and pressing the molten film of the transparent multilayer film between a first rotating or circulating mirror-finished body and a second rotating or circulating mirror-finished body, wherein (C) the first mirror-finished body has a surface temperature of 100 to 200° C.; and (D) the second mirror-finished body has a surface temperature of 20 to 200° C.

According to at least one embodiment, there is provided a method for producing a hard coat-laminated film, including the steps of: (1) producing a transparent multilayer film by a method according to the steps of (A) continuously coextruding, with a coextrusion apparatus equipped with an extruder and a T die, a molten film of a transparent multilayer film from the T die, wherein the transparent multilayer film has a first poly(meth)acrylimide resin layer (α1), an aromatic polycarbonate resin layer (β), and a second poly(meth)acrylimide resin layer (α2), the layers being laminated directly in this order; and (B) feeding and pressing the molten film of the transparent multilayer film between a first rotating or circulating mirror-finished body and a second rotating or circulating mirror-finished body, wherein (C) the first mirror-finished body has a surface temperature of 100 to 200° C.; and (D) the second mirror-finished body has a surface temperature of 20 to 200° C.; and (2) forming a hard coat on at least one surface of the transparent multilayer film obtained in the step (1).

According to at least one embodiment, the step (2) is a step of forming the hard coat whose surface has a pencil hardness of 7H or higher.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
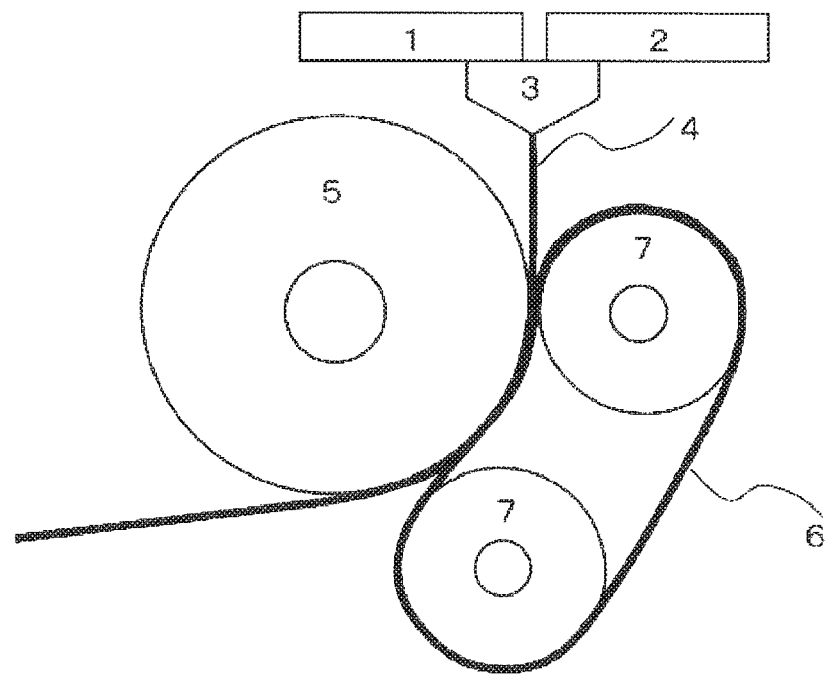
FIG. 1 is a view of a coextrusion film production apparatus to be used the production method according to an embodiment of the invention.

Although the following detailed description contains many specific details for purposes of illustration, it is understood that one of ordinary skill in the relevant art will appreciate that many examples, variations, and alterations to the following details are within the scope and spirit of the invention. Accordingly, the exemplary embodiments of the invention described herein are set forth without any loss of generality, and without imposing limitations, relating to the claimed invention. Like numbers refer to like elements throughout. Prime notation, if used, indicates similar elements in alternative embodiments.

Transparent Multilayer Film

The transparent multilayer film according to an embodiment of the invention is made by laminating a first poly(meth)acrylimide resin layer (α1), an aromatic polycarbonate resin layer (β), and a second poly(meth)acrylimide resin layer (α2), directly in this order.

Whereas a poly(meth)acrylimide resin is excellent in surface hardness, but does not have high punching processability, an aromatic polycarbonate resin is excellent in punching processability, but does not have high surface hardness. Hence, by making the above layer structure, there can be made a transparent multilayer film excellent in both of the surface hardness and the punching processability by combining merits of the both.

According to an embodiment of the invention, a poly(meth)acrylimide resin to be used for the above α1 layer and the above α2 layer is a resin, which maintains characteristics, as they are, of acrylic resins of high transparency, high surface hardness and high rigidity, also has characteristics introduced thereto of polyimide resins of excellent heat resistance and dimensional stability, and is improved in a drawback of coloration from light yellow to reddish brown. Moreover, it also has thermoplasticity.

A poly(meth)acrylimide herein refers to a polyacrylimide or a polymethacrylimide.

A poly(meth)acrylimide resin to be used in accordance with an embodiment of the invention is not limited as long as having a high transparency and exhibiting no coloration for the purpose of being used for a transparent multilayer film, and any poly(meth)acrylimide resin can be used.

Preferable poly(meth)acrylimide resins include ones having a yellowness index (which is measured according to JIS K7105:1981) of 3 or lower. The yellowness index of the poly(meth)acrylimide resin is preferably 2 or lower, and more preferably 1 or lower. Further from the viewpoint of extrusion load and molten film stability, preferable poly(meth)acrylimide resins include ones having a melt mass flow rate (which is measured according to ISO1133 under the condition of 260° C. and 98.07 N) of 0.1 to 20 g/10 min. The melt mass flow rate of the poly(meth)acrylimide resin is more preferably 0.5 to 10 g/10 min. Further the glass transition temperature of the poly(meth)acrylimide resin is, from the viewpoint of the heat resistance, preferably 150° C. or higher, and more preferably 170° C. or higher.

Commercially available examples of the poly(meth)acrylimide resins include "PLEXIMID TT70" (trade name) of Evonik Industry AG.

According to an embodiment of the invention, a poly(meth)acrylimide resin to be used for the above α1 layer and a poly(meth)acrylimide resin to be used for the above α2 layer may be ones having different resin characteristics, for example, different melt mass flow rates and glass transition temperatures. From the viewpoint of curling resistance of the transparent multilayer film, use of the poly(meth) acrylimide resins having the same resin characteristics is preferable. For example, use of poly(meth)acrylimide resins of the same grade and the same lot is one of preferred aspects.

According to an embodiment of the invention, the poly (meth)acrylimide resin can further contain, as long as not being contrary to the object of the invention, thermoplastic resins other than the poly(meth)acrylimide resins; pigments, inorganic fillers, organic fillers, resin fillers; additives such as lubricants, antioxidants, weather-resistance stabilizers, thermal stabilizers, mold releasing agents, antistatic agents and surfactants; and the like, as desired. The amount of the optional component(s) blended is, with respect to 100 parts by mass of the poly(meth)acrylimide resin, usually about 0.01 to 10 parts by mass.

As an aromatic polycarbonate resin to be used for the above β layer, there can be used one or a mixture of two or more of aromatic polycarbonate resins, for example, a polymer obtained by an interfacial polymerization method of an aromatic dihydroxy compound such as bisphenol A and 1,1-bis(4-hydroxyphenyl)-3,3,5-trimethylcyclohexane with phosgene; and a polymer obtained by a transesterification reaction of an aromatic dihydroxy compound such as bisphenol A and 1,1-bis(4-hydroxyphenyl)-3,3,5-trimethylcyclohexane with a carbonate diester such as diphenyl carbonate.

Preferable optional components that the aromatic polycarbonate resin can contain include core shell rubber. The impact resistance of an aromatic polycarbonate resin layer can be more enhanced by using a core shell rubber in an amount such that, with respect to 100 parts by mass of the total of the aromatic polycarbonate resin and the core shell rubber, the core shell rubber is 0 to 30 parts by mass (the aromatic polycarbonate resin is 100 to 70 parts by mass), and preferably 0 to 10 parts by mass (the aromatic polycarbonate resin is 100 to 90 parts by mass).

Examples of the core shell rubber include one or a mixture of two or more types of core shell rubber of methacrylate.styrene/butadiene rubber graft copolymers, acrylonitrile styrene/butadiene rubber graft copolymers, acrylonitrile.styrene/ethylene.propylene rubber graft copolymers, acrylonitrile.styrene/acrylate graft copolymers, methacrylate/acrylate rubber graft copolymers, methacrylate.acrylonitrile/acrylate rubber graft copolymers, and the like.

Further the aromatic polycarbonate resin can contain, as long as not being contrary to the object of the embodiments of the invention, thermoplastic resins other than the aromatic polycarbonate resins and the core shell rubber; pigments, inorganic fillers, organic fillers, resin fillers; additives such as lubricants, antioxidants, weather-resistance stabilizers, thermal stabilizers, mold releasing agents, antistatic agents and surfactants; and the like, as desired. The amount of the optional component(s) blended is, with respect to 100 parts by mass of the total of the aromatic polycarbonate resin and the core shell rubber, usually about 0.01 to 10 parts by mass.

The transparent multilayer film according to at least one embodiment of invention satisfies the following requirements (i) and (ii). Hence, the transparent multilayer film can suitably be used as a base material for touch panel display face plates or transparent conductive substrates.

(i) A total light transmittance of higher than 90%; and
(ii) (ii) a haze of 2.0% or lower.

When the total light transmittance of the transparent multilayer film is higher than 90%, the transparent multilayer film can suitably be used as a base material for touch panel display face plates or transparent conductive substrates. A higher total light transmittance is more preferable. The total light transmittance is preferably 92% or higher. The total light transmittance here can be measured according to JIS K7361-1:1997.

When the haze of the transparent multilayer film is 2.0% or lower, the transparent multilayer film can suitably be used as a base material for touch panel display face plates or transparent conductive substrates. A lower haze thereof is more preferable. The haze is preferably 1.5% or lower. The haze here can be measured according to JIS K7136-2000.

In order to suitably use the transparent multilayer film as a base material for touch panel display face plates or transparent conductive substrates, the retardation is preferably 50 nm or lower. A lower retardation is more preferable; and the retardation is more preferably 40 nm or lower, and still more preferably 30 nm or lower.

The thickness of the above α1 layer is not especially limited, but may be, from the viewpoint of holding the surface hardness high, usually 10 µm or larger, preferably 20 µm or larger, more preferably 40 µm or larger, and still more preferably 60 µm or larger. The thickness of the above α2 layer is not especially limited, but is preferably the same layer thickness as that of the α1 layer from the viewpoint of the curling resistance. The thickness of the above β layer is not especially limited, but may be, from the viewpoint of the punching processability, usually 10 µm or larger, preferably 20 µm or larger, more preferably 80 µm or larger, and still more preferably 120 µm or larger.

Here, the "same layer thickness" should not be understood as being the same layer thickness in a physicochemically strict sense. It should be understood as being the same layer thickness in the deviation range in the process and quality controls usually industrially carried out. This is because in the case of the same layer thickness in the deviation range in the process and quality controls usually industrially carried out, the curling resistance of the transparent multilayer film can be held good. In the case of a non-stretched multilayer film by a T die coextrusion method, since the thicknesses are subjected to the process and quality control usually in deviations of about −5 to +5 µm, layer thicknesses of 65 µm and 75 µm should be understood as being the same. The "same layer thickness" here can be said as being the "substantially same layer thickness" in other words.

The total thickness of the transparent multilayer film is not especially limited, and can be any thickness as desired. From the viewpoint of the handleability, the total thickness may be usually 20 µm or larger, and preferably 50 µm or larger. In the case of use as touch panel display face plates, from the viewpoint of holding the rigidity, the total thickness may be usually 100 µm or larger, preferably 200 µm or larger, and more preferably 300 µm or larger. Further from the viewpoint of meeting the requirement of the touch panel thickness reduction, the total thickness may be usually 1,500 µm or smaller, preferably 1,200 µm or smaller, and more preferably 1,000 µm or smaller. Further from the viewpoint of the economic efficiency, the total thickness (in the case of an application other than touch panel face plates, where a high rigidity is not needed) may be usually 250 µm or smaller, and preferably 150 µm or smaller.

Production Method

A production method to obtain the transparent multilayer film according to various embodiments of the invention is not especially limited, but includes, for example, a method comprising the steps of:

(A) continuously coextruding, with a coextrusion apparatus equipped with an extruder and a T die, a molten film of a transparent multilayer film from the T die, wherein the transparent multilayer film has a first poly(meth)acrylimide resin layer (α1), an aromatic polycarbonate resin layer (β), and a second poly(meth)acrylimide resin layer (α2), the layers being laminated directly in this order; and (B) feeding and pressing the molten film of the transparent multilayer film between a first rotating or circulating mirror-finished body and a second rotating or circulating mirror-finished body.

The extruder is not especially limited, and any one can be used. Examples thereof include a single-screw extruder, a co-rotation twin-screw extruder and a counter-rotation twin-screw extruder.

The T die is not especially limited, and any one can be used. Examples thereof include a manifold die, a fish tail die, and a coat hanger die.

The coextrusion apparatus is not especially limited, and any one can be used. Examples thereof include a feed block system, a multimanifold system and a stack plate system.

Further in order to suppress the deterioration of the poly(meth)acrylimide resin and the aromatic polycarbonate resin, the extruder interior may be preferably purged with nitrogen.

Further since the poly(meth)acrylimide resin is a resin having a high hygroscopicity, it is preferable that the poly(meth)acrylimide resin be dried before being fed to film production. It is also preferable that the poly(meth)acrylimide resin dried in a drier be conveyed directly to and charged in an extruder. The set temperature of the drier is preferably 100 to 150° C. It is also preferable that a vacuum vent be installed usually on a measuring zone at the screw head.

It is preferable in order to stably carry out the continuous extrusion step of the molten film of the transparent multilayer film that the temperature of the T die be set at lowest at 260° C. or higher. The temperature of the T die is more preferably 270° C. or higher. It is also preferable in order to suppress the deterioration of the poly(meth)acrylimide resin and the aromatic polycarbonate resin that the temperature of the T die be set at 350° C. or lower.

Further it is preferable that the ratio (R/T) of the lip opening (R) to the thickness (T) of the obtained transparent multilayer film be 1 to 5. From the viewpoint of preventing the increase in the retardation, the ratio (R/T) is preferably 5 or lower. By contrast, from the viewpoint of suppressing the extrusion load, the ratio (R/T) is preferably 1 or higher. The ratio (R/T) is more preferably 1.1 to 2.5.

Examples of the first mirror-finished body include a mirror-finished roll and a mirror-finished belt. Examples of the second mirror-finished body include a mirror-finished roll and a mirror-finished belt.

The mirror-finished roll is a roll whose surface has been subjected to a mirror surface processing, and includes a metal-made one, a ceramic-made one, and a silicon rubber-made one. Further with respect to the surface of the mirror-finished roll, for the purpose of protection from corrosion and scratching, the surface can be subjected to a chromium plating, an iron-phosphorus alloy plating, or a hard carbon treatment by a PVD method or a CVD method.

The "mirror surface processing" here is not especially limited, and a surface may be processed into a mirror-finished state by known means such as polishing using fine abrasive grains. For example, the first and/or second mirror-finished body may preferably have an arithmetic average roughness (Ra) of 100 nm or smaller, and more preferably 50 nm or smaller. Further for example, the first and/or second mirror-finished body may preferably have a ten-point average roughness (Rz) of 500 nm or smaller, and more preferably 200 nm or smaller.

The mirror-finished belt is usually a metal-made seamless belt, whose surface has been subjected to a mirror surface processing, and is made to be stretched and circulated between a pair of rollers. Further, for the purpose of protection from corrosion and scratching, the surface of the mirror-finished belt can be subjected to a chromium plating, an iron-phosphorus alloy plating, or a hard carbon treatment by a PVD method or a CVD method.

Though there is no intention of being bound by any theory, the reason why the transparent multilayer film satisfying the above requirements (i) and (ii) can be obtained by the film production method is believed as follows: when the molten film of the transparent multilayer film is pressed between the first mirror-finished body and the second mirror-finished body, the highly smooth surface state of the first mirror-finished body and the second mirror-finished body is transferred to the film to correct faulty portions such as die streaks.

In order for the transfer of the above surface state to be well carried out, the surface temperature of the first mirror-finished body is made to be preferably 100° C. or higher, more preferably 120° C. or higher, and still more preferably 130° C. or higher. Further in order to prevent the development on the film of appearance faults (exfoliation marks) accompanying the peeling-off from the first mirror-finished body, the surface temperature of the first mirror-finished body is made to be preferably 200° C. or lower, and more preferably 160° C. or lower.

In order for the transfer of the above surface state to be well carried out, the surface temperature of the second mirror-finished body is made to be preferably 20° C. or higher, more preferably 60° C. or higher, and still more preferably 100° C. or higher. Further in order to prevent the development on the film of appearance faults (exfoliation marks) accompanying the peeling-off from the second mirror-finished body, the surface temperature of the second mirror-finished body is made to be preferably 200° C. or lower, and more preferably 160° C. or lower.

Here, it is preferable that the surface temperature of the first mirror-finished body be made higher than the surface temperature of the second mirror-finished body. This is to make the film to be held on the first mirror-finished body and to be delivered to a following transfer roll.

By referring to FIG. 1, one example of preferable aspects of the production method according to at least one embodiment of the invention will be described. FIG. 1 schematically illustrates a coextrusion film production apparatus to be used in the production method according to an embodiment of the invention.

According to an embodiment of the invention, a poly(meth)acrylimide resin is, before being fed to film production, fully dried at a set temperature of 100 to 150° C., and thereafter conveyed from the drier directly to an extruder 1, and charged therein. The extruder 1 has been purged with nitrogen and vented under vacuum in a measuring zone at the screw head. An aromatic polycarbonate resin is, before being fed to film production, fully dried at a set temperature of 80 to 120° C., and thereafter conveyed from the drier directly to an extruder 2, and charged therein. The extruder 2 has been purged with nitrogen and vented under vacuum in a measuring zone at the screw head. The poly(meth)acrylimide resin and the aromatic polycarbonate resin are fed to a coextrusion T die 3 of a two-kind three-layer multimanifold system by the extruder 1 and the extruder 2, respectively; and these are coextruded continuously therefrom so that the poly(meth)acrylimide resin is disposed as both outer layers and the aromatic polycarbonate resin is disposed as an intermediate layer. Thereby, a molten film 4 of a transparent multilayer film is formed in which a first poly(meth)acrylimide resin layer (α1), an aromatic polycarbonate resin layer (β), and a second poly(meth)acrylimide resin layer (α2) are laminated directly in this order.

The temperature of the coextrusion T die 3 is set at preferably 260° C. or higher, and more preferably 270° C. or higher, and preferably 350° C. or lower. The lip opening is regulated so that ratio (R/T) of the lip opening (R) to the thickness (T) of the obtained transparent multilayer film can fall within the range of preferably 1 to 5, and more preferably 1.1 to 2.5.

Then, the coextruded molten film 4 is fed and pressed between a rotating mirror-finished roll 5 and a mirror-finished belt 6 stretched and circulated along on the outer peripheral surface of the mirror-finished roll 5 between a pair of belt rollers 7 so that the α1 layer is on the mirror-finished roll 5 side. Consequently, the highly smooth surface state of the mirror-finished roll 5 and the mirror-finished belt 6 is transferred to the film to correct faulty portions such as die streaks, thereby making a transparent multilayer film excellent in surface smoothness, transparency and appearance.

As the mirror-finished roll 5 and the mirror-finished belt 6, the above-mentioned ones can be used.

The mirror-finished belt 6, on being pressed on the mirror-finished roll 5, comes to be circulated along the outer peripheral surface of the mirror-finished roll 5. Therefore, the use of the mirror-finished roll 5 and the mirror-finished belt 6 enables the pressing of the molten film 4 to be carried out on its surface, whereby the transfer of the above surface state and the correction of the above faulty portions can securely be carried out.

The above pair of belt rollers 7 is, in order to highly hold the parallelism of the mirror-finished roll 5 with the mirror-finished belt 6, usually suspended on a support stand capable of finely regulating the space therebetween vertically and backward and forward. Further by using the space between the pair of belt rollers 7, the tension of the mirror-finished belt 6 can be regulated.

In order for the transfer of the above surface state to be well carried out, the surface temperature of the mirror-finished roll 5 is 100° C. or higher, preferably 120° C. or higher, and more preferably 130° C. or higher. Further in order to prevent the development on the transparent multilayer film of appearance faults (exfoliation marks) accompanying the peeling-off from the mirror-finished roll 5, the surface temperature of the mirror-finished roll 5 is 200° C. or lower, and preferably 160° C. or lower.

In order for the transfer of the above surface state to be well carried out, the surface temperature of the mirror-finished belt 6 is 20° C. or higher, preferably 60° C. or higher, and more preferably 100° C. or higher. Further in order to prevent the development on the transparent multilayer film of appearance faults (exfoliation marks) accompanying the peeling-off from the mirror-finished belt 6, the surface temperature of the mirror-finished belt 6 is 200° C. or lower, and preferably 160° C. or lower.

Here, it is preferable that the surface temperature of the mirror-finished roll 5 be made to be higher than that of the mirror-finished belt 6. This is to make the film to be held on the mirror-finished roll 5 and to be delivered to a following transfer roll.

Hard Coat-laminated Film

The transparent multilayer film according to at least one embodiment of the invention can be made into a hard coat-laminated film by forming a hard coat at least on one surface of the transparent multilayer film.

The coating material for forming the hard coat is not especially limited as long as having a high transparency and exhibiting no coloration for the purpose that a hard coat-laminated film to be obtained is used as a touch panel display face plate or a transparent conductive substrate, and any coating material can be used.

Preferable coating materials for forming the hard coat include ones capable of forming hard coats excellent further in surface hardness and scratch resistance as well. Specifically, the coating materials include active energy-ray curable resin compositions described below.

The active energy-ray curable resin compositions referred to herein are resin compositions which can be polymerized and cured by active energy rays such as ultraviolet rays and electron beams to form hard coats. Examples of the active energy-ray curable resin compositions include compositions containing an active energy-ray curable resin together with a compound having two or more isocyanate groups (—N═C═O) in one molecule thereof and/or a photopolymerization initiator.

Examples of the active energy-ray curable resin compositions include one or more selected from (meth)acryloyl group-containing prepolymers or oligomers such as polyurethane(meth)acrylate, polyester(meth)acrylate, polyacryl (meth)acrylate, poly epoxy(meth)acrylate, polyalkylene glycol poly(meth)acrylate and poly ether(meth)acrylate; (meth)acryloyl group-containing monofunctional reactive monomers such as methyl(meth)acrylate, ethyl(meth)acrylate, n-butyl(meth)acrylate, hexyl(meth)acrylate, 2-ethylhexyl(meth)acrylate, lauryl(meth)acrylate, isobornyl(meth)acrylate, dicyclopentenyl(meth)acrylate, dicyclopentenyloxyethyl(meth)acrylate, phenyl(meth)acrylate, phenyl cellosolve(meth)acrylate, 2-methoxyethyl (meth)acrylate, hydroxyethyl(meth)acrylate, hydroxypropyl (meth)acrylate, 2-acryloyloxyethyl hydrogen phthalate, dimethylaminoethyl(meth)acrylate, trifluoroethyl(meth)acrylate and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, poly ethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate. Other examples thereof include resins containing one or more of these active energy-ray curable resins as their constituting monomers. The active energy-ray curable resins can be used singly or as a mixture of two or more.

(Meth)acrylate referred to herein means acrylate or methacrylate.

Examples of the compounds having two or more isocyanate groups in one molecule thereof include methylenebis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurates of tolylene diisocyanate, isocyanurates of hexamethylene diisocyanate, isocyanurates of isophorone diisocyanate, and biurets of hexamethylene diisocyanates; and urethane crosslinking agents such as blocked isocyanates of the above polyisocyanates. These may be used singly or in a combination of two or more. Further in crosslinking, there may be added, as required, a catalyst such as dibutyltin dilaurate or dibutyltin diethylhexanoate.

Examples of the photopolymerization initiator include benzophenone compounds such as benzophenone, methylo-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyObenzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetic acid ester compounds; hydroxyketone compounds; and aminobenzoate compounds. These may be used singly or in a combination of two or more.

Further the active energy-ray curable resin composition may contain, as required, one or two or more additives such as antistatic agents, surfactants, leveling agents, thixotropy imparting agents, antifouling agents, printability improvers, antioxidants, weather-resistance stabilizers, light-resistance stabilizers, ultraviolet absorbents, thermal stabilizers, colorants and fillers.

Among optional components used in the active energy-ray curable resin composition if needed, preferable ones include microparticles having an average particle diameter of 1 nm to 300 nm. By using the microparticles in 1 to 300 parts by mass, preferably 20 to 100 parts by mass, with respect to 100 parts by mass of the active energy-ray curable resin components, the hardness of the hard coat can be raised.

As the microparticles, either of inorganic microparticles and organic microparticles can be used. Examples of the inorganic microparticles include silica (silicon dioxide); metal oxide microparticles such as aluminum oxide, zirconia, titania, zinc oxide, germanium oxide, indium oxide, tin oxide, indium tin oxide, antimony oxide and cerium oxide; metal fluoride microparticles such as magnesium fluoride and sodium fluoride; metal microparticles; metal sulfide microparticles; and metal nitride microparticles. Examples of the organic microparticles include resin beads of styrenic resins, acrylic resins, polycarbonate resins, ethylenic resins, and cured resins of amino group-containing compounds with formaldehyde. These may be used singly or in a combination of two or more.

Further for the purpose of enhancing the dispersibility of the particles in the coating material and raising the hardness of the hard coat layer to be obtained, there may be used the microparticles whose surfaces are treated with silane coupling agents such as vinylsilane and aminosilane; titanate coupling agents; aluminate coupling agents; organic compounds having a reactive functional group such as an ethylenic unsaturated bond group such as a (meth)acryloyl group, a vinyl group and an allyl group, and an epoxy group; and surface treating agents such as fatty acids and fatty acid metal salts.

Among these microparticles, in order to obtain hard coat having a higher hardness, microparticles of silica or aluminum oxide are preferable; and microparticles of silica are more preferable. Commercially available products of silica microparticles include, for example, Snowtex (trade name) of Nissan Chemical Industries, Ltd., and Quatron (trade name) of Fuso Chemical Co., Ltd.

The average particle diameter of the microparticles is, in order to maintain the transparency of the hard coat layer and sufficiently attain the hardness improving effect, preferably 300 nm or smaller. The average particle diameter of the microparticles is preferably 200 nm or smaller, and more preferably 120 nm or smaller. On the other hand, there is especially no lower limit of the average particle diameter of the microparticles, but the average particle diameter of usually available particles is about 1 nm at the finest.

Herein, the average particle diameter of the microparticles is a particle diameter at which the microparticle cumulation from the small particle diameter side becomes 50 mass % in a particle size distribution curve measured using a laser diffraction scattering particle size analyze "MT3200II" (trade name) of Nikkiso Co., Ltd.

Further the active energy-ray curable resin composition may contain a solvent, as required, in order to dilute with the solvent into an easily coatable concentration. The solvent is not especially limited unless reacting with essential components and any other optional component(s) of the curable resin composition, and catalyzing (accelerating) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol, and acetone.

The active energy-ray curable resin composition can be obtained by mixing and stirring these components.

A method for forming a hard coat by using a coating material for forming the hard coat such as an active energy-ray curable resin composition is not especially limited, and a known web coating method can be used. Examples of such coating methods include methods of roll coating, gravure coating, reverse coating, roll brushing, spray coating, air knife coating and die coating.

When the surface hardness (i.e., pencil hardness measured according to the method to be illustrated in Examples) of the hard coat is 7H or higher, it is preferable because the hard coat-laminated film can suitably be used as a base material for touch panel display face plates or transparent conductive substrates. The surface hardness of the hard coat is more preferably 8H or higher, and still more preferably 9H or higher.

The thickness of the hard coat is, from the viewpoint of providing a surface hardness (pencil hardness) in the above range, preferably 17 μm or larger, more preferably 20 μm or larger, and still more preferably 25 μm or larger. By contrast, from the viewpoint of holding the handleability of the webs, the thickness of the hard coat is preferably 100 μm or smaller, and more preferably 50 μm or smaller.

Further in the case where a hard coat is formed on the transparent multilayer film according to at least one embodiment of the invention, from the viewpoint of the curling resistance, it is preferable to form the hard coat on each of both surfaces of the transparent multilayer film.

When a hard coat is formed to make the hard coat-laminated film according to at least one embodiment of the invention, in order to enhance the adhesive strength between the transparent multilayer film and the hard coat, the surface for the hard coat to be laminated of the transparent multilayer film as a base material may previously be subjected to an easy-adhesion treatment such as a corona discharge treatment or an anchor coat formation.

The corona discharge treatment involves passing the film between an insulated electrode and a dielectric roll, and applying a high-frequency high-voltage therebetween to generate a corona discharge thereby treating the film surface. The corona discharge ionizes oxygen and the like; and the ions collide against the film surface to cause the scission of resin molecule chains and the addition of oxygen-containing functional groups to resin molecule chains on the film surface thereby enabling for the adhesive strength with the hard coat to be improved. After the corona discharge treatment, an anchor coat may further be formed.

Whether or not the amount of the treatment (S) per unit area and unit time of the corona discharge treatment is sufficient to improve the adhesive strength with the hard coat can be judged by using the wetting index (which is measured according to JIS K6768:1999). The wetting index meeting expectation of a sufficient adhesive strength is usually 50 mN/m or higher, and preferably 60 mN/m or higher. The amount of the treatment (S) needed to obtain the above wetting index is usually 80 W·min/m² or more, and preferably 120 W·min/m² or more.

Further from the viewpoint of preventing the deterioration of the film, the amount of the treatment (S) of the corona discharge treatment is preferably suppressed to 500 W·min/m² or less. The amount of the treatment (S) is more preferably 400 W·min/m² or less.

Here, the amount of the treatment (S) is defined by the following expression.

$$S=P/(L\cdot V)$$

wherein, S: an amount of a treatment (W·min/m²); P: a discharge power (W); L: a length of the discharge electrode (m); and V: a line velocity (m/min).

An anchor coat agent for forming the anchor coat is not especially limited as long as having a high transparency and exhibiting no coloration for the purpose of using the hard coat-laminated film to be obtained as a touch panel display face plate or a transparent conductive substrate. As the anchor coat agent, there can be used, for example, a known one such as a polyester, an acrylic, a polyurethane, an acrylic urethane and a polyester urethane. Among these, a thermoplastic urethane anchor coat agent is preferable from the viewpoint of improving the adhesive strength with the hard coat.

Further as the anchor coat agent, there may be used a coating material containing a silane coupling agent. Suitable examples of the silane coupling agent are silane compounds having at least two different reactive groups selected from a hydrolyzable group (for example, an alkoxy group such as a methoxy group and an ethoxy group, an acyloxy group such as an acetoxy group, and a halogen group such as a chloro group), and an organic functional group (for example, an amino group, a vinyl group, an epoxy group, a methacryloxy group, an acryloxy group and an isocyanate group). The silane coupling agent functions to improve the adhesive strength with the hard coat. Among these, from the viewpoint of improving the adhesive strength with the hard coat, silane coupling agents having an amino group are preferable.

A coating material containing the silane coupling agent may be one containing the silane coupling agent as the main component (50 mass % or more in terms of the solid content). It is preferred that 75 mass % or more of the solid content of the coating material is the silane coupling agent. A more preferable proportion is 90 mass % or more.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxy silane.

A method for forming an anchor coat by using the anchor coat agent is not especially limited, and a known web coating method can be used. Specific examples of such coating methods include methods of roll coating, gravure coating, reverse coating, roll brushing, spray coating, air knife coating and die coating. At this time, as required, there can be used an optional diluting solvent(s), for example, methanol, ethanol, 1-methoxy-2-propanol, n-butyl acetate, toluene, methyl ethyl ketone, methyl isobutyl ketone, ethyl acetate and acetone.

Further the anchor coat agent may contain, within the limits of not being contrary to the purpose of the present invention, one or two or more additives such as antioxidants, weather-resistance stabilizers, light-resistance stabilizers, ultraviolet absorbents, thermal stabilizers, antistatic agents, surfactants, colorants, infrared blocking agents, leveling agents, thixotropy imparting agents and fillers.

The dry thickness of the anchor coat is usually about 0.01 to 5 μm, and preferably 0.1 to 2 μm.

EXAMPLES

Hereinafter, the present invention will be described by way of Examples, but the embodiments of the invention are not limited thereto.

Measurement Methods

Total Light Transmittance

The total light transmittance was measured according to JIS K7361-1:1997 by using a turbidimeter "NDH2000" (trade name) of Nippon Denshoku Industries Co., Ltd.

Haze

The haze was measured according to JIS K7136:2000 by using a turbidimeter "NDH2000" (trade name) of Nippon Denshoku Industries Co., Ltd.

Retardation

The retardation was measured by using a phase difference analyzer "KOBRA-WR" (trade name) using a parallel Nicol rotation method of Oji Scientific Instruments Co., Ltd.

Surface Appearance

While a film surface (both surfaces) was irradiated with light of a fluorescent lamp by changing the incident angle in various directions, the film surface was visually observed, and evaluated according to the following criteria.

⊚: The surface exhibited no undulations nor flaws, and even when being held up nearby to the light, no impression of cloudiness.

○: When being looked closely into, the surface had a few recognized undulations and flaws. When being held up nearby to the light, a slight impression of cloudiness was exhibited.

Δ: The surface had recognized undulations and flaws, and gave an impression of cloudiness.

x: The surface had a large number of recognized undulations and flaws, and also gave a definite impression of cloudiness.

Color Tone

The yellowness index (YI) was measured according to JIS K7105:1981 by using a chromaticity meter "SolidSpec-3700" (trade name) manufactured by Shimadzu Corp.

Pencil Hardness

The pencil hardness of both surfaces of the film was evaluated according to JIS K5600-5-4 by using a pencil "UNI" (trade name) of Mitsubishi Pencil Co., Ltd under the condition of a load of 750 g.

For the hard coat-laminated film, the hard coat surface was evaluated.

Linear expansion coefficient (thermal dimensional stability)

The linear expansion coefficient was measured according to JIS K7197:1991. The measurement used a thermomechanical analyzer (TMA) "EXSTAR6000" (trade name) of Seiko Instruments Inc. The test piece had a size of 20 mm in length and 10 mm in width, and was sampled so that the machine direction (MD) of the film became the longitudinal direction of the test piece. The condition regulation of the test piece was carried out at a temperature of 23° C.±2° C. and a relative humidity of 50±5% for 24 hours; and for the purpose of measuring the dimensional stability as a value of a physical property of the film, the condition regulation at the highest temperature in the measurement was not carried out. The interchuck distance was made to be 10 mm; and the temperature program was made to be such that the test piece was held at a temperature of 20° C. for 3 min, and thereafter heated at a temperature-rise rate of 5° C./min up to 270° C. The linear expansion coefficient was calculated from a temperature-test piece length curve, acquired under the condition that for the transparent multilayer film, the low temperature-side temperature was set at 30° C. and the high temperature-side temperature was set at 180° C.; and for the hard coat-laminated film, the low temperature-side temperature was set at 30° C. and the high temperature-side temperature was set at 250° C.

Punching Processability

Figure 2:
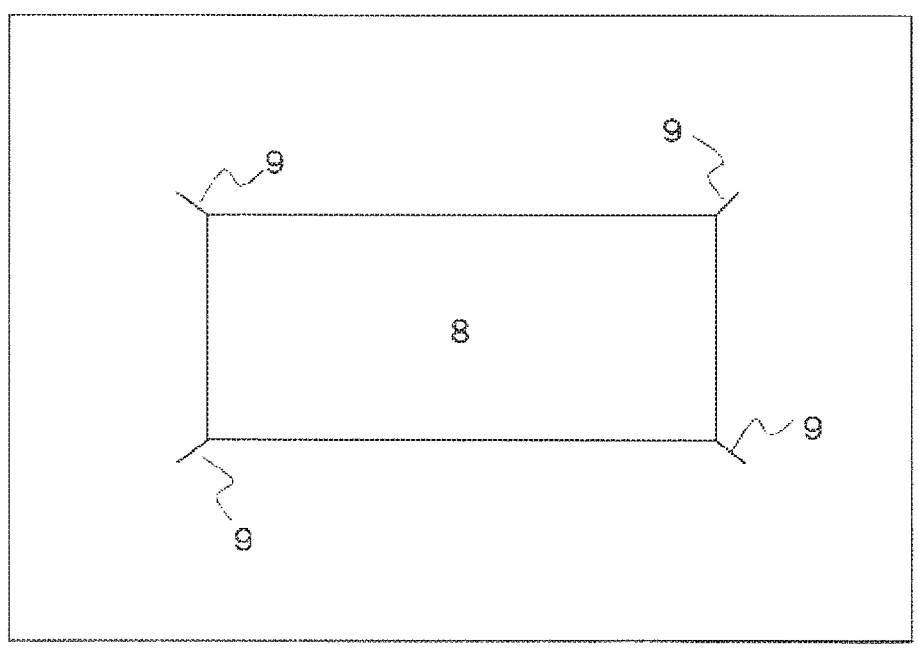
FIG. 2 is a view of cracks generated at four corners of a punched hole produced in a film after a dumbbell is punched out in the film in a punching processability test according to an embodiment of the invention.

A dumbbell of 50 mm in length and 30 mm in width was punched out in a film so that the machine direction of the film became the longitudinal direction of the punched-out piece. The punching operation used a punching die of a Thomson blade and a lever-controlled manual-type cutting press "SDL-100" (trade name) commercially available from Dumbbell Co., Ltd. The punching processability was evaluated according to the following criteria from whether or not breaking and chipping were generated in the dumbbell, and the average value (N=12) of lengths of cracks (FIG. 2 illustrates its conceptual view) generated at four corners of a punched hole. "N=12" here means a calculation of an average value of the lengths at 12 points in total in three sheets of the film each having four points. For the hard coat-laminated film, the punching operation was carried out from the hard coat surface side.

⊚: there were observed no breaking and chipping in the dumbbell; and no cracks were generated, or the crack length was 2.0 mm or shorter.

○: there were observed no breaking and chipping in the dumbbell; and the crack length was longer than 2.0 mm and 3.5 mm or shorter.

Δ: there were observed no breaking and chipping in the dumbbell; and the crack length was longer than 3.5 mm and 5.0 mm or shorter.

x: there were observed no breaking and chipping in the dumbbell; and the crack length was longer than 5.0 mm.

xx: breaking and chipping were generated in the dumbbell.

Curling Resistance

Samples of 10 cm in length×10 cm in width were taken from 15 points in total in the film where the 15 points are the total of three points of a central part, a left edge part and a right edge part in the width direction thereof for each of 5 places at every 10 m in the machine direction thereof. The curling heights of four corners of the samples each sampled and placed on a horizontal plane were measured. Among the whole 15 samples, one exhibiting a highest curling height was evaluated according to the following criteria.

⊚: the curling height was lower than 5 mm.

○: the curling height was 5 mm or higher and lower than 10 mm.

Δ: the curling height was 10 mm or higher and lower than 25 mm.

x: the curling height was 25 mm or higher.

Cross cut test (adhesivity of the transparent multilayer film with the hard coat)

Cross cuts were scored so as to make 100 squares (1 square: 1 mm×1 mm) on the hard coat-laminated film from the hard coat side thereof according to JIS K5600-5-6:1999; thereafter, a tape for adherence test was pasted on the cross cuts, and squeezed across by finger, and then peeled off. The evaluation criteria were according to table 1 in the above JIS. Herein, however, class 0 is represented as ⊚; class 1, as ○; class 2, as Δ; class 3, as x; class 4, as xx; and class 5, as xxx.

Finger Slidability

The finger slidability was evaluated by impressions of whether or not the touch surface-side hard coat surface of the hard coat-laminated film could be desiredly rubbed when being rubbed up and down and right and left or circularly by a forefinger. The test was carried out by 10 test members each, and the case where the test sample could be desiredly rubbed was determined to have scored 2 points; the case where the test sample could be almost desiredly rubbed, 1 points; and the case where the test sample could not be desiredly rubbed including that the finger was caught or otherwise, 0 point, and points of all the test members were totalized and the evaluation was carried out according to the following criteria.

⊚: 16 to 20 points

Δ: 10 to 15 points x: 0 to 9 points

Stain Resistance

The touch surface-side hard coat surface of the hard coat-laminated film was spottely stained with a red oil-based marker; thereafter, the stained portion was covered with a watch glass and left at room temperature for 24 hours. Then, the stained portion was wiped and cleaned by using Kimwipe (trade name) sufficiently impregnated with isopropyl alcohol until no stain came to be newly attached on the Kimwipe; thereafter, the portion was visually observed and the evaluation was carried out according to the following criteria.

⊚: There was no stain.

○: There was slight stain remaining.

Δ: There was considerable stain remaining.

x: There was stain remaining significantly.

Water Contact Angle

The water contact angle of the touch surface-side hard coat surface of the hard coat-laminated film was measured at 25° C. at 1 atm by using an automatic contact angle tester "DSA20" (trade name) manufactured by KRUSS GmbH and a method of calculating the water contact angle from a width and height of a water droplet (see JIS R3257:1999).

Abrasion Resistance

A sample of 200 mm in length×25 mm in width of the hard coat-laminated film was taken so that the longitudinal direction of the sample became the machine direction of the film, and was placed on a Gakushin (Japan Society for the Promotion of Science)-type tester according to JIS L0849 so that the touch surface-side hard coat directed to surface. Then, a #0000 steel wool was attached to a friction pin of the Gakushin tester; a load of 500 g was mounted; and the surface of the test piece was rubbed 100 times reciprocatingly. The surface was visually observed and the evaluation was carried out according to the following criteria.

◉: There was no scratches.
○: There was 1 to 5 scratches.
Δ: There was 6 to 10 scratches.
x: There was 11 or more scratches.

Printability

The name of the first-listed inventor was entered on a printing surface-side hard coat surface of the hard coat-laminated film by using the superfine side of an oil-based marker "My Name Twin" (trade name) of Sakura Color Products Corp., and the evaluation was carried out according to the following criteria.

◉: Clean characters without any blur and cissing could be written.
○: Slight blur and cissing were recognized on written characters.
x: Written characters had unclear portions due to blur and cissing.

Raw Materials Used

Raw materials used in the following Examples, Comparative Examples and Reference Examples were as follows.

(a) A poly(meth)acrylimide resin
(a-1) a poly(meth)acrylimide "PLEXIMID TT70" (trade name) of Evonik Industry AG
(b) Aromatic polycarbonate resins
(b-1): an aromatic polycarbonate "Calibre 301-4" (trade name) of Sumika Styron Polycarbonate Ltd.
(b-2): an aromatic polycarbonate "Apec 2097" (trade name) of Bayer Material Science Ltd.
(c) Coating materials for forming hard coats
(c-1): 30 parts by mass of the following (c1), 70 parts by mass of the following (c2), 4 parts by mass of the following (c4) and 30 parts by mass of methyl ethyl ketone were mixed and stirred thereby obtaining a coating material (c-1) for forming a hard coat.
(c-2): 65 parts by mass of the following (c1), 65 parts by mass of the following (c3), 6.5 parts by mass of the following (c4), 5.9 parts by mass of the following (c5), and 25 parts by mass of methyl ethyl ketone and 10 parts by mass of methyl butyl ketone were mixed and stirred thereby obtaining a coating material (c-2) for forming a hard coat.
(c-3): 65 parts by mass of the following (c1), 65 parts by mass of the following (c3), 6.5 parts by mass of the following (c4) and 0.55 parts by mass of the following (c6), and 25 parts by mass of methyl ethyl ketone and 10 parts by mass of methyl isobutyl ketone were mixed and stirred thereby obtaining a coating material (c-3) for forming a hard coat.
(c-4): 65 parts by mass of the following (c1), 65 parts by mass of the following (c3), 6.5 parts by mass of the following (c4) and 0.55 parts by mass of the following (c7), and 25 parts by mass of methyl ethyl ketone and 10 parts by mass of methyl isobutyl ketone were mixed and stirred thereby obtaining a coating material (c-4) for forming a hard coat.
(c-5): 65 parts by mass of the following (c1), 65 parts by mass of the following (c3), 6.5 parts by mass of the following (c4) and 0.55 parts by mass of the following (c8), and 25 parts by mass of methyl ethyl ketone and 10 parts by mass of methyl isobutyl ketone were mixed and stirred thereby obtaining a coating material (c-5) for forming a hard coat.

(c1): dipentaerythritol hexaacrylate of Nippon Kayaku Co., Ltd.
(c2): a mixed coating material "LaromerPO9026" (trade name) of a polyether acrylate with nano silica particles (average particle diameter: 20 nm) in 50:50 (mass ratio) of BASF S
(c3): a mixed coating material "NANOBYK-3605" (trade name) of hexanediol diacrylate with surface-treated nano silica particles (average particle diameter: 20 nm) in 50:50 (mass ratio) of Big Chemy Japan KK
(c4): a phenyl ketone photopolymerization initiator (1-hydroxycyclohexyl phenyl ketone) "SB-PI714" (trade name) of Shuang-Bang Ind. Corp.
(c5): a hydroxyl group-containing silicon-modified acrylic surface regulator "BYK-SILCLEAN3700" (trade name) of Big Chemy Japan KK
(c6): an acrylic surface regulator "BYK-352" (trade name) of Big Chemy Japan KK
(c7): an acrylic surface regulator "BYK-358N" (trade name) of Big Chemy Japan KK
(c8): a modified silicone surface regulator "Polyflow KL-403" (trade name) of Kyoueisha Chemical Co., Ltd.

Example 1

A coextrusion apparatus having a structure illustrated in FIG. 1 was used. A molten film 4 of a transparent multilayer film was continuously extruded from a coextrusion T die 3 of a two-kind three-layer multimanifold system. In this operation, the above (a-1) was extruded by an extruder 1 as both outer layers (an α1 layer and an α2 layer) of the molten film of the transparent multilayer film; the above (b-1) was extruded by an extruder 2 as an intermediate layer (a β layer) thereof; and the α1 layer, the β layer and the α2 layer were laminated directly in this order. The molten film 4 of the transparent multilayer film was fed and pressed between a rotating mirror-finished roll 5 and a mirror-finished belt 6 circulating along the outer peripheral surface of the mirror-finished roll so that the α1 layer was on the mirror-finished roll 5 side, thereby obtaining the transparent multilayer film in which the total thickness was 250 μm; the thickness of the α1 layer was 80 μm; that of the β layer was 90 μm; and that of the α2 layer was 80 μm. With respect to the set condition at this time, the drying temperatures before the film production were made to be 150° C. for the (a-1) and 100° C. for the (b-1). The set temperatures of the extruder 1 were made to be C1/C2/C3/C4/C5/AD=260/290 to 290° C.; and those of the extruder 2 were made to be C1/C2/C3/C4/C5/C6/AD=260/280/280/260 to 260/270° C. Either of the extruders 1 and 2 was purged with nitrogen, and used a vacuum vent. The set temperature of the T die was made to be 300° C.; the lip opening, 0.5 mm; the set temperature of the mirror-finished roll 5, 130° C.; the set temperature of the mirror-finished belt 6, 120° C.; the applied pressure, 1.4 MPa; and the taking-up velocity, 6.5 m/min. The obtained film was subjected to measurements and evaluation tests for the total light transmittance, the haze, the retardation, the surface appearance, the yellowness index (the color tone), the pencil hardness, the linear expansion coefficient (thermal dimensional stability), the punching processability and the curling resistance. The results are shown in Table 1.

Example 2

A film production was carried out wholly as in Example 1, except for altering the raw materials and the film production conditions to those indicated in Table 1. The physical property measurements and evaluation results are shown in Table 1.

Examples 3 to 7

Film productions were carried out wholly as in Example 1, except for altering the layer constitution to those indicated in Table 1. The physical property measurements and evaluation results are shown in Table 1.

Examples 8 to 11, and Comparative Examples 1 and 2

Film productions were carried out wholly as in Example 1, except for altering the film production conditions to those indicated in Table 2. The physical property measurements and evaluation results are shown in Table 2.

Comparative Example 3

A film production was carried out wholly as in Example 1, except for altering the raw materials to those indicated in Table 2. The physical property measurements and evaluation results are shown in Table 2.

Example 12

A film production was carried out wholly as in Example 1, except for altering the total thickness to 500 μm, the thickness of the α1 layer to 80 μm, that of the β layer to 340 μm, that of the α2 layer to 80 μm, and the taking-up velocity to 3.3 m/min. The physical property measurements and evaluation results are shown in Table 2.

TABLE 1

| | | Example 1 | Example 2 | Example 3 | Example 4 | Example 5 | Example 6 | Example 7 |
|---|---|---|---|---|---|---|---|---|
| Raw Materials | Raw Materials Used for α 1 Layer | a-1 | a-1 | a-1 | a-1 | a-1 | a-1 | a-1 |
| | Raw Materials Used for PC | b-1 | b-2 | b-1 | b-1 | b-1 | b-1 | b-1 |
| | Raw Materials Used for α 2 Layer | a-1 | a-1 | a-1 | a-1 | a-1 | a-1 | a-1 |
| Film Production Conditions | First Mirror-finished Body | roll | roll | roll | roll | roll | roll | roll |
| | Second Mirror-finished Body | belt | belt | belt | belt | belt | belt | belt |
| | Temperature of First Mirror-finished Body °C. | 130 | 140 | 130 | 130 | 130 | 130 | 130 |
| | Temperature of Second Mirror-finished Body °C. | 120 | 130 | 120 | 120 | 120 | 120 | 120 |
| Layer constitution | Total Thickness of Film μm | 250 | 250 | 250 | 250 | 250 | 250 | 250 |
| | Thickness of α 1 Layer μm | 80 | 80 | 100 | 90 | 70 | 60 | 90 |
| | Thickness of β Layer μm | 90 | 90 | 50 | 70 | 110 | 130 | 90 |
| | Thickness of α 2 Layer μm | 80 | 80 | 100 | 90 | 70 | 60 | 70 |
| Evaluation Results | Total Light Transmittance % | 93 | 93 | 93 | 93 | 93 | 93 | 93 |
| | Haze % | 0.3 | 0.3 | 0.3 | 0.3 | 0.3 | 0.3 | 0.3 |
| | Retardation nm | 8 | 8 | 9 | 8 | 7 | 7 | 8 |
| | Surface Appearance | ⊚ | ⊚ | ⊚ | ⊚ | ⊚ | ⊚ | ⊚ |
| | Yellowness Index | 0.6 | 0.6 | 0.5 | 0.5 | 0.7 | 0.7 | 0.6 |
| | Pencil Hardness of α 1 Layer Side | HB | F | F | F | B | 2B | HB |
| | Pencil Hardness of α 2 Layer Side | HB | F | F | F | B | 2B | B |
| | Linear Expansion Coefficient ppm | 35 | 30 | 30 | 35 | 35 | 40 | 35 |
| | Punching-Resistant Processability | ⊚ | ○ | Δ | ○ | ⊚ | ⊚ | ⊚ |
| | Curling Resistance | ⊚ | ⊚ | ⊚ | ⊚ | ⊚ | ⊚ | ○ |

TABLE 2

| | | Example 8 | Example 9 | Example 10 | Example 11 | Example 12 | Comparative Example 1 | Comparative Example 2 | Comparative Example 3 |
|---|---|---|---|---|---|---|---|---|---|
| Raw Materials | Raw Materials Used for α 1 Layer | a-1 | a-1 | a-1 | a-1 | a-1 | a-1 | a-1 | a-1 |
| | Raw Materials Used for PC | b-1 | b-1 | b-1 | b-1 | b-1 | b-1 | b-1 | b-1 |
| | Raw Materials Used for α 2 Layer | a-1 | a-1 | a-1 | a-1 | a-1 | a-1 | a-1 | a-1 |
| Film Production Conditions | First Mirror-finished Body | roll | roll | roll | roll | roll | roll | roll | roll |
| | Second Mirror-finished Body | belt | belt | belt | belt | belt | belt | belt | belt |
| | Temperature of First Mirror-finished Body °C. | 130 | 130 | 160 | 110 | 130 | 75 | 130 | 130 |
| | Temperature of Second Mirror-finished Body °C. | 75 | 40 | 140 | 75 | 120 | 40 | 10 | 120 |
| Layer constitution | Total Thickness of Film μm | 250 | 250 | 250 | 250 | 500 | 250 | 250 | 250 |
| | Thickness of α 1 Layer μm | 80 | 80 | 80 | 80 | 80 | 80 | 80 | 80 |
| | Thickness of β Layer μm | 90 | 90 | 90 | 90 | 340 | 90 | 90 | 90 |
| | Thickness of α 2 Layer μm | 80 | 80 | 80 | 80 | 80 | 80 | 80 | 80 |
| Evaluation Results | Total Light Transmittance % | 93 | 93 | 93 | 92 | 92 | 88 | 90 | 93 |
| | Haze % | 0.6 | 0.9 | 0.2 | 1.2 | 0.5 | 2.1 | 1.8 | 0.5 |
| | Retardation nm | 12 | 19 | 9 | 21 | 6 | 29 | 27 | 20 |
| | Surface Appearance | ◎ | ◎ | ◎ | ◎ | ◎ | Δ | ○ | ◎ |
| | Yellowness Index | 0.6 | 0.6 | 0.6 | 0.6 | 0.6 | 0.6 | 0.6 | 0.5 |
| | Pencil Hardness of α 1 Layer Side | HB | HB | HB | HB | HB | HB | HB | F |
| | Pencil Hardness of α 2 Layer Side | HB | HB | HB | HB | HB | HB | HB | F |
| | Linear Expansion Coefficient ppm | 35 | 35 | 35 | 35 | 35 | 50 | 45 | 20 |
| | Punching-Resistant Processability | ◎ | ◎ | ◎ | ◎ | ◎ | ◎ | ◎ | × |
| | Curling Resistance | ◎ | ◎ | ◎ | ◎ | ◎ | ◎ | ◎ | ◎ |

Example 13

A corona discharge treatment was carried out on both surfaces of the transparent multilayer film obtained in the above Example 1, under the condition of an amount of the treatment of 167 W·min/m² (discharge power: 500 W, discharge electrode length: 1 m, line velocity: 3 m/min). The wetting indices were 64 mN/m for both the surfaces. Then, a hard coat-laminated film for a touch panel display face plate was obtained by applying the above (c-1) as a coating material for forming a touch surface-side hard coat on the α1 layer-side surface so that the dry thickness of the hard coat became 25 μm by using a die-system coating apparatus, and applying the above (c-3) as a coating material for forming a printing surface-side hard coat on the α2 layer-side surface so that the dry thickness of the hard coat became 25 μm by using a die-system coating apparatus. The obtained hard coat-laminated film was subjected to measurements and evaluation tests of the total light transmittance, the haze, the surface appearance, the yellowness index (the color tone), the pencil hardness, the linear expansion coefficient (thermal dimensional stability), the punching processability, the curling resistance, the cross cut test (adhesivity of the transparent multilayer film with the hard coat), the finger slidability, the stain resistance, the water contact angle, the abrasion resistance and the printability. The results are shown in Table 3.

Here, the tests of the hard coat surfaces are represented, in columns of the Table, as "an evaluation result of a touch surface-side hard coat/an evaluation result of a printing surface-side hard coat." For example, the representation of "9H/9H" in the column of pencil hardness means that the pencil hardness of a touch surface-side hard coat is 9H, and the pencil hardness of a printing surface-side hard coat is 9H. Further "–" means that the test was omitted because the measurement item is a property not being required as a touch surface side or a printing surface side.

Example 14

A hard coat-laminated film was obtained wholly as in Example 13, except for using the above coating material (c-2) in place of the above coating material (c-1) as a coating material for forming a touch surface-side hard coat. The physical property measurements and evaluation results are shown in Table 3.

Example 15

A hard coat-laminated film was obtained wholly as in Example 14, except for using the above coating material (c-4) in place of the above coating material (c-3) as a coating material for forming a printing surface-side hard coat. The physical property measurements and evaluation results are shown in Table 3.

Example 16

A hard coat-laminated film was obtained wholly as in Example 14, except for using the above coating material (c-5) in place of the above coating material (c-3) as a coating material for forming a printing surface-side hard coat. The physical property measurements and evaluation results are shown in Table 3.

Example 17

A hard coat-laminated film was obtained wholly as in Example 14, except for making the dry thickness of the touch surface-side hard coat to be 20 μm, and the dry thickness of the printing surface-side hard coat to be 15 μm. The physical property measurements and evaluation results are shown in Table 3.

Example 18

A corona discharge treatment was carried out on both surfaces of the transparent multilayer film obtained in the above Example 12, under the condition of an amount of the treatment of 167 W·min/m$^2$ (discharge power: 500 W, discharge electrode length: 1 m, line velocity: 3 m/min). The wetting indices were 64 mN/m for both the surfaces. Then, a hard coat-laminated film for a touch panel display face plate was obtained by applying the above (c-1) as a coating material for forming a touch surface-side hard coat on the α1 layer-side surface so that the dry thickness of the hard coat became 25 μm by using a die-system coating apparatus, and applying the above (c-3) as a coating material for forming a printing surface-side hard coat on the α2 layer-side surface so that the dry thickness of the hard coat became 25 μm by using a die-system coating apparatus. The obtained hard coat-laminated film was subjected to measurements and evaluation tests of the total light transmittance, the haze, the surface appearance, the yellowness index (the color tone), the pencil hardness, the linear expansion coefficient (thermal dimensional stability), the punching processability, the curling resistance, the cross cut test (adhesivity of the transparent multilayer film with the hard coat), the finger slidability, the stain resistance, the water contact angle, the abrasion resistance and the printability. The results are shown in Table 3.

essability. Further, the surface hardness was high and the color tone, heat resistance and dimensional stability were also good. Further the retardation was also low. Hence, the transparent multilayer film can suitably be used as a base material for touch panel display face plates and transparent conductive substrates. By contrast, Comparative Examples 1 and 2 were out of the range(s) as defined in the present invention in one or both of the total light transmittance and haze, and the evaluations of the surface state in these comparative examples were also insufficient. Comparative Example 3 was inferior in the punching processability because having no aromatic polycarbonate resin layer.

As shown in Table 3, it has been found that the hard coat-laminated film according to the present invention developed physical properties suitable as a base material for touch panel display face plates or transparent conductive substrates.

Embodiments of the invention provide a transparent multilayer film, which is excellent in surface smoothness, transparency, appearance and punching processability. Hence, the transparent multilayer film can suitably be used as a base material for touch panel display face plates or transparent conductive substrates.

Further by a production method according to at least one embodiment of the invention, there can be obtained the transparent multilayer film excellent in surface smoothness, transparency, appearance and punching processability. Hence, the transparent multilayer film obtained by the production method according to various embodiments of the invention can suitably be used as a base material for touch panel display face plates or transparent conductive substrates.

Further the transparent multilayer film can suitably be used also as members of image display apparatuses such as liquid crystal displays, plasma displays and electroluminescence displays.

According to at least one embodiment, the figures illustrate the following:
1: Extruder 1
2: Extruder 2

TABLE 3

|  |  | Example 13 | Example 14 | Example 15 | Example 16 | Example 17 | Example 18 |
|---|---|---|---|---|---|---|---|
| Conditions | Coating Material for Forming Touch Surface-Side Hard Coat | c-1 | c-2 | c-2 | c-2 | c-2 | c-1 |
|  | Coating Material for Forming Printing Surface-Side Hard Coat | c-3 | c-3 | c-4 | c-5 | c-3 | c-3 |
|  | Thickness of Hard Coat μm | 25/25 | 25/25 | 25/25 | 25/25 | 20/15 | 25/25 |
| Evaluation Results | Total Light Transmittance % | 91 | 91 | 91 | 91 | 91 | 91 |
|  | Haze % | 0.3 | 0.3 | 0.3 | 0.3 | 0.3 | 0.4 |
|  | Surface Appearance | ◎ | ◎ | ◎ | ◎ | ◎ | ◎ |
|  | Yellowness Index | 0.5 | 0.5 | 0.5 | 0.5 | 0.5 | 0.6 |
|  | Pencil Hardness | 9H/9H | 9H/9H | 9H/9H | 9H/9H | 9H/9H | 9H/9H |
|  | Linear Expansion Coefficient ppm | 15 | 15 | 15 | 15 | 15 | 15 |
|  | Punching-Resistant Processability | o/o | o/o | o/o | o/o | o/o | o/o |
|  | Curling Resistance | ◎ | ◎ | ◎ | ◎ | ○ | ◎ |
|  | Cross Cut Test | ◎/◎ | ◎/◎ | ◎/◎ | ◎/◎ | ◎/◎ | ◎/◎ |
|  | Finger Slidability | ◎/— | ◎/— | ◎/— | ◎/— | ◎/— | ◎/— |
|  | Stain Resistance | ◎/— | ◎/— | ◎/— | ◎/— | ◎/— | ◎/— |
|  | Water Contact Angle Degree | 108/— | 108/— | 108/— | 108/— | 108/— | 108/— |
|  | Abrasion Resistance | ◎/— | ◎/— | ◎/— | ◎/— | ◎/— | ◎/— |
|  | Printability | —/◎ | —/◎ | —/◎ | —/◎ | —/◎ | —/◎ |

As shown in Table 1 and Table 2, it has been found that the transparent multilayer films according to at least one embodiment of the invention were excellent in surface smoothness, transparency, appearance and punching proc- 3: Coextrusion T die of two-kind three-layer multimanifold-system
4: Molten film
5: Mirror-finished roll 6: Mirror-finished belt
7: A pair of belt rollers
8: Punched hole produced in film after dumbbell was punched out in the film
9: Cracks generated at four corners of the punched hole Embodiments of the invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur. As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the embodiments of the present invention.

Ranges may be expressed herein as from about one particular value, and/or to about another particular value. When such a range is expressed, it is to be understood that another embodiment is from the one particular value and/or to the other particular value, along with all combinations within said range.

All publications mentioned are incorporated by reference to disclose and describe the methods or materials, or both, in connection with which the publications are cited. The publications discussed are provided solely for their disclosure prior to the filing date of the present application. Nothing is to be construed as an admission that the invention is not entitled to antedate such publication by virtue of prior invention. Further, the dates of publication provided may be different from the actual publication dates, which may need to be independently confirmed.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A transparent multilayer film, comprising:
a first poly(meth)acrylimide resin layer ($\alpha 1$);
an aromatic polycarbonate resin layer (($\beta$); and
a second poly(meth)acrylimide resin layer ($\alpha 2$), the layers being laminated directly in this order,
wherein the transparent multilayer film satisfies the following requirements (i), (ii) and (iii):
(i) a total light transmittance of higher than 90%;
(ii) (ii) a haze of 2.0% or lower; and
(iii) a retardation of 50 nm or lower.

2. A hard coat-laminated film, comprising a transparent multilayer film according to claim 1, and a hard coat formed on at least one surface the transparent multilayer film.

3. An image display apparatus member, comprising a film according to claim 1.

4. A method for producing a transparent multilayer film, comprising the steps of:
continuously coextruding, with a coextrusion apparatus equipped with an extruder and a T die, a molten film of a transparent multilayer film from the T die, wherein the transparent multilayer film has a first poly(meth) acrylimide resin layer ($\alpha 1$), an aromatic polycarbonate resin layer ($\beta$), and a second poly(meth)acrylimide resin layer ($\alpha 2$), the layers being laminated directly in this order;
feeding and pressing the molten film of the transparent multilayer film between a first rotating or circulating mirror-finished body and a second rotating or circulating mirror-finished body; and
delivering the molten film to a following transfer roll while making the molten film to be held on the first rotating or circulating mirror-finished body,
wherein the first rotating or circulating mirror-finished body has a surface temperature of 100° C. or higher and 200° C. or lower, the second rotating or circulating mirror-finished body has a surface temperature of 20° C. or higher and less than 200° C., and the surface temperature of the first rotating or circulating mirror-finished body is higher than the surface temperature of the second rotating or circulating mirror-finished body.

5. A method for producing a hard coat-laminated film, comprising the steps of:
(1) producing a transparent multilayer film by a method according to claims 4; and
(2) forming a hard coat on at least one surface of the transparent multilayer film obtained in the step (1).

6. A transparent multilayer film according to claim 1, wherein the transparent multilayer film has a retardation of 12 nm or lower.

7. A method according to claim 4, wherein the surface temperature of the first mirror-finished body is 10 to 90° C. higher than the surface temperature of the second mirror-finished body.

8. A method according to claim 4, wherein the surface temperature of the first mirror-finished body ranges from 120 to 200° C.; and the surface temperature of the second mirror-finished body ranges from 20° C. or higher and less than 200° C.

9. A method for producing an image display apparatus, which comprises incorporating a film obtained by the method according to any one of claim 4, 5, or 7 into the image display apparatus as a member of the image display apparatus.

* * * * *